(12) United States Patent
Buckley

(10) Patent No.: US 11,603,030 B2
(45) Date of Patent: Mar. 14, 2023

(54) TRUCK BED PARTITIONING DEVICE

(71) Applicant: Red White & Rusty Relics LLC, Birmingham, MI (US)

(72) Inventor: David Buckley, Marine City, MI (US)

(73) Assignee: RED WHITE & RUSTY RELICS LLC, Birmingham, MI (US)

(*) Notice: Subject to any disclaimer, the term of this patent is extended or adjusted under 35 U.S.C. 154(b) by 406 days.

(21) Appl. No.: 16/906,470

(22) Filed: Jun. 19, 2020

(65) Prior Publication Data
US 2021/0394667 A1 Dec. 23, 2021

(51) Int. Cl.
*B60P 7/08* (2006.01)
*B60P 7/135* (2006.01)
*F16B 5/00* (2006.01)
*B60P 7/15* (2006.01)

(52) U.S. Cl.
CPC ............ *B60P 7/135* (2013.01); *B60P 7/0892* (2013.01); *B60P 7/15* (2013.01); *F16B 5/0004* (2013.01)

(58) Field of Classification Search
CPC .......... B60P 7/15; B60P 7/135; B60P 7/0892; B60P 7/14; E04B 2001/1963; E04B 2001/2644; E04B 2001/2676; E04B 2001/405; E04B 1/40; E04H 12/06; E04H 17/1447; E04H 17/1473; E04H 17/1488
USPC ................ 410/121, 129, 130, 140, 143–145, 410/150–152
See application file for complete search history.

(56) References Cited

U.S. PATENT DOCUMENTS

| | | | |
|---|---|---|---|
| 1,760,955 A * | 6/1930 | Moss ...................... | E04B 1/585 403/410 |
| 4,733,899 A | 3/1988 | Keys | |
| 5,253,913 A | 10/1993 | Metivier | |
| 5,320,464 A * | 6/1994 | Long ........................ | B60P 7/15 410/151 |
| 6,089,804 A | 7/2000 | Bartelt | |
| 6,692,204 B1 * | 2/2004 | Ricard .................. | B60P 7/0892 410/121 |
| 7,160,071 B2 | 1/2007 | Legge | |
| 7,503,738 B1 * | 3/2009 | Doyle ...................... | B60P 7/15 410/121 |
| 8,931,987 B2 * | 1/2015 | Hibbard .................. | B60P 7/135 410/121 |
| 2019/0338557 A1 * | 11/2019 | Crandall ............. | E04H 17/1417 |

* cited by examiner

*Primary Examiner* — Stephen T Gordon
(74) *Attorney, Agent, or Firm* — The Dobrusin Law Firm, P.C.

(57) ABSTRACT

This invention discloses a connector device with a particular T shape, which allows for the connection of two pieces of lumber in a perpendicular fashion. A user secures the connector device to two pieces lumber and fit it within a truck bed, setting up three separate compartments for storage within the truck bed. By using two or more connector devices, and three or more pieces of lumber, at least four separate compartments can be created.

14 Claims, 3 Drawing Sheets

TRUCK BED PARTITIONING DEVICE

TECHNICAL FIELD

The present invention relates generally to truck beds, and, more particularly, to devices to assist with using lumber to divide truck beds into separated bed areas.

BACKGROUND OF THE INVENTION

In the art of partitioning truck beds, especially beds of pickup trucks, it is well known to attempt to provide compartments to maximize space utilization for the truck beds. Typically, workers in this industry use 2"×4" lengths of lumber to fashion divisions within a truck bed, utilizing screws and/or nails to hold the lumber in place.

With this in mind, throughout the years, a number of innovations have been developed relating to utilizing the space of pickup truck beds, and the following U.S. patents are representative of some of those innovations: U.S. Pat. Nos. 4,733,899, 7,160,071, 5,253,913, 6,089,804. These devices disclose complex partitioning systems for truck beds. However, none of these devices provide for quick and simple installation of the divider system. They are manufactured out of relatively expensive materials, and they take up a large amount of storage space. In this respect, it would be desirable if a device were provided that allowed for quick installation of partitions in a truck bed.

Pickup truck owners and users may need to completely remove a truck bed dividing device from the truck bed. In this regard, it is best if such a device is easily and quickly removable. Moreover, for such a truck bed divider device that is easily removed from the truck bed, it is best to avoid drilling holes or otherwise permanently damaging any portion of the truck or the truck bed. Such a device, when removed, should be easily stored, without taking up too much space, whether in the truck bed or elsewhere. In this respect, the truck bed partitioning device should easily store when it is not needed.

Thus, while the existing prior art discloses several different methods to partition a truck bed, the prior art described above does not teach or suggest a partitioning device which: (1) can be used in conjunction with an existing truck bed surface; (2) enables quick installation and uninstallation of the partitioning system; (3) does not require drilling holes or otherwise permanently damaging the truck or the truck bed and (4) is composed of inexpensive materials. The foregoing desired characteristics are provided by the unique truck bed partitioning device of the present invention as will be made apparent from the following description thereof.

SUMMARY OF THE INVENTION

This invention solves the problem of allowing pickup truck drivers and owners to quickly assemble a truck bed partition with inexpensive, lightweight components. With this invention, workers no longer have to install heavy metal bracing or plates. Only minimal amounts of hardware are required. The system for partitioning the truck bed takes advantage of lumber, which is often already at the disposal of workers needing to partition their truck beds. A connector device is provided, with a particular T shape, which allows for the connection of two pieces of lumber in a perpendicular fashion. The user secures the connector device to the lumber and fits it within the truck bed, setting up separate compartments.

DETAILED DESCRIPTION OF THE PREFERRED EMBODIMENTS

Figure 1:
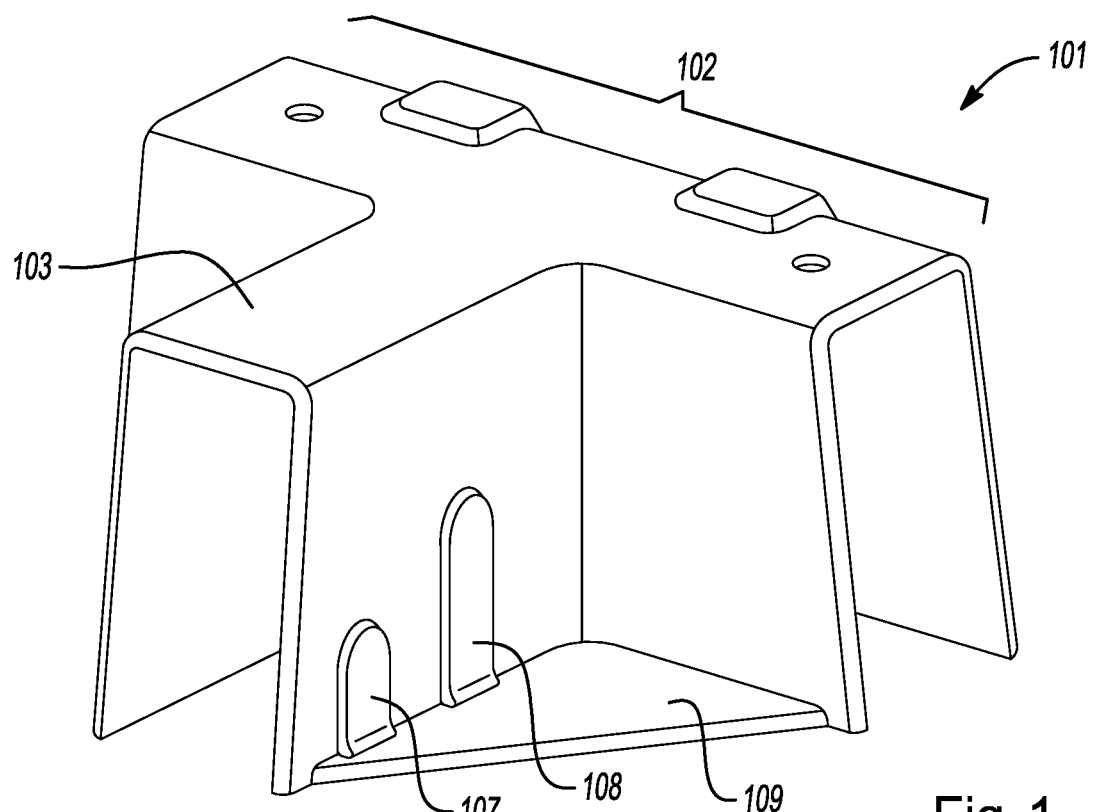
FIG. 1 is a front side view of the connector.
Figure 4:
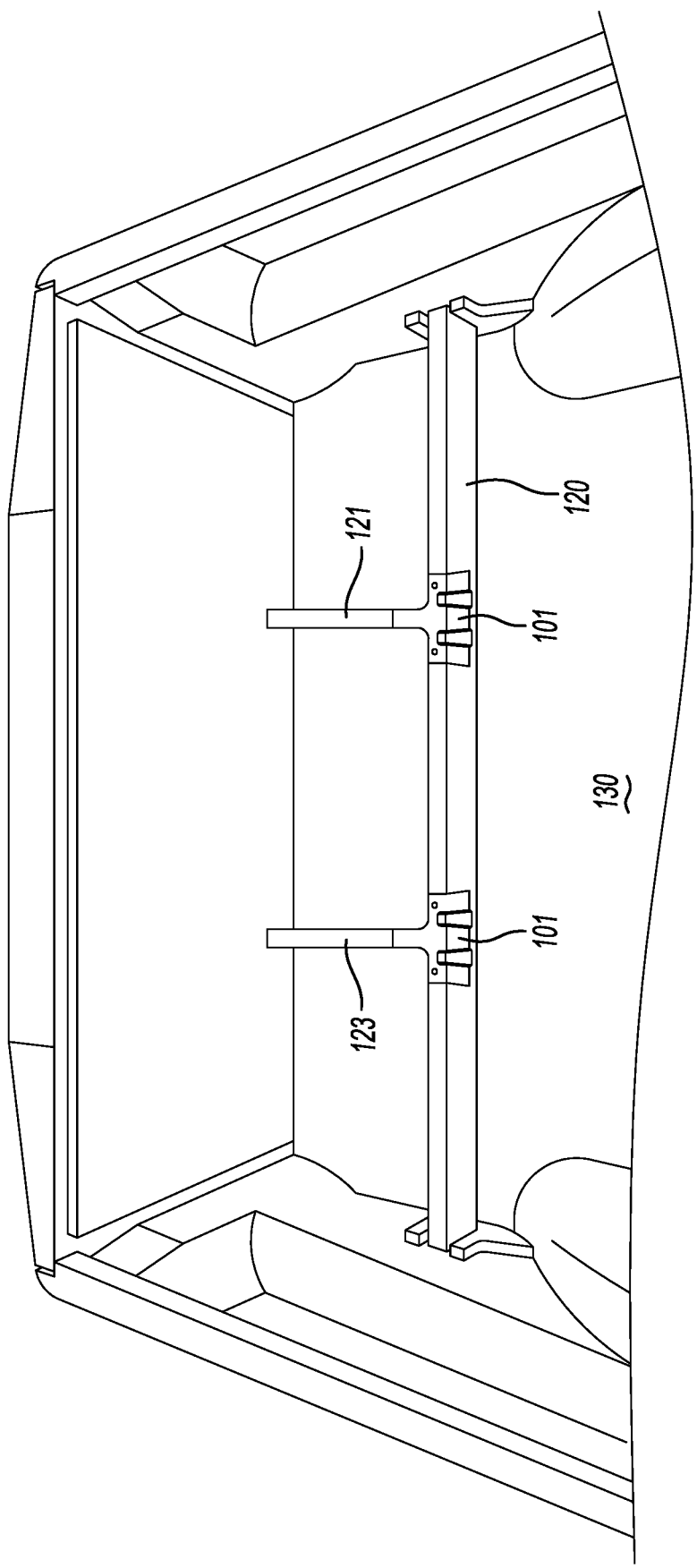
FIG. 4 is a diagram of showing two connectors fitted with lumber, as assembled in a pickup truck bed.

In accordance with the invention, FIG. 1 shows a three-way connector 101 for lumber comprising a main channel 102 with an interior width to accommodate a piece of lumber 120 (FIG. 4). The main channel 102 contains a branch channel 103 at the midway point of the main channel 102, positioned at a ninety (90) degree angle to the main channel 102, with an interior width to accommodate a piece of lumber 121 (FIG. 4). The connector 101 thus resembles a T shape.

Figure 2A:
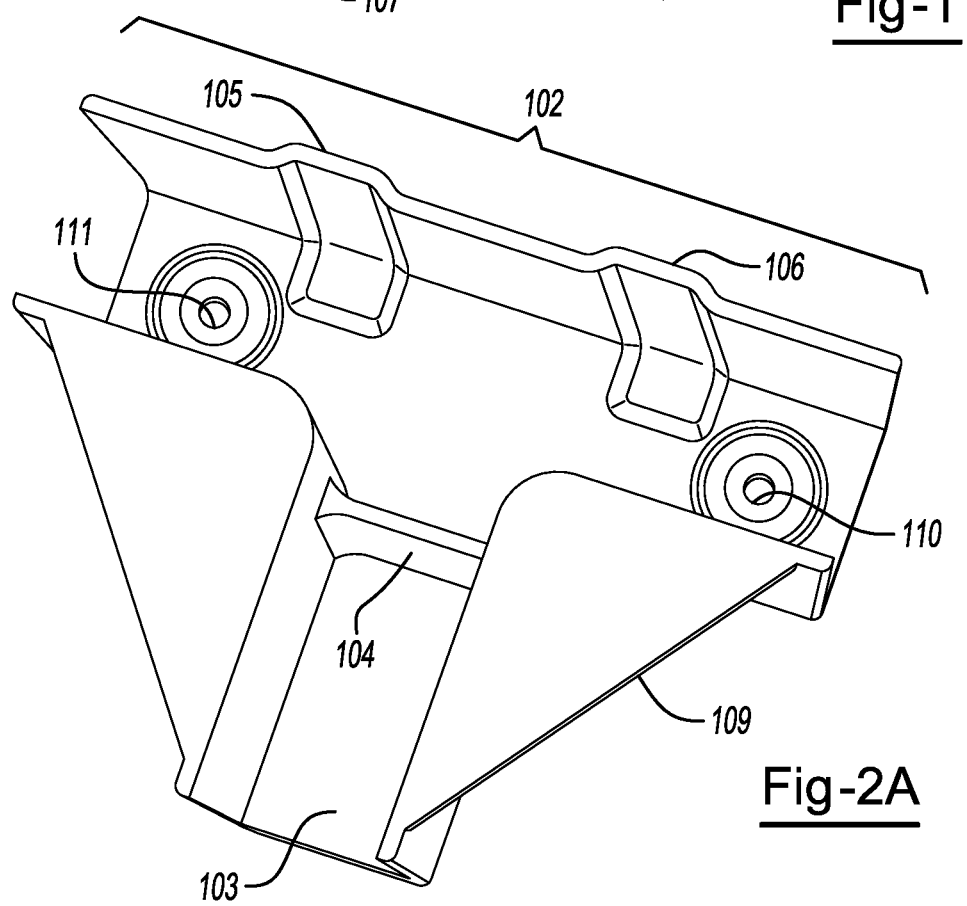
FIG. 2A is a plan view of the underside of the connector.

FIG. 2A shows that the connector 101 further comprises a divider panel 104 inside the branch channel 103. The divider panel 104 is oriented parallel to the main channel 102 and located at the connection of the main channel 102 to the branch channel 103. The divider panel 104 helps to strengthen the connector 101 and provides a stopping point for a piece of lumber 121 when used in conjunction with the method described herein to partition a truck bed 130 (FIG. 4) into sections.

Figure 3:
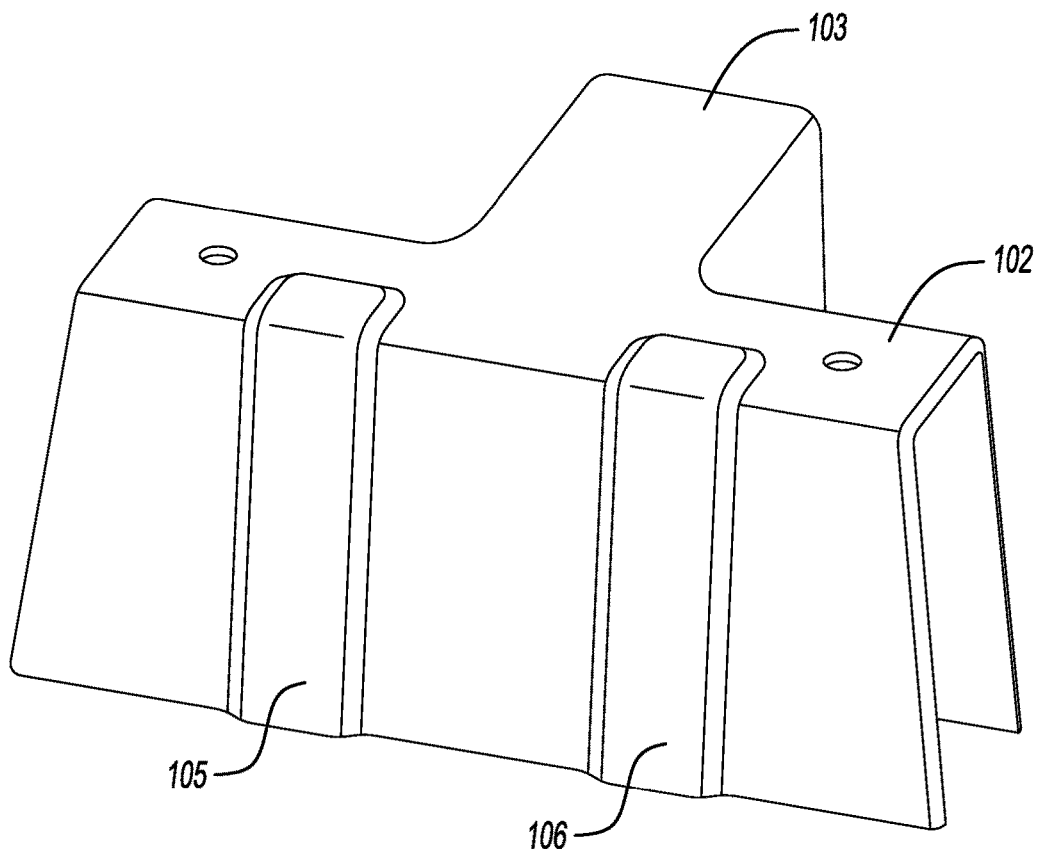
FIG. 3 is a rear view of the connector.

FIG. 3 shows two reinforcement buttresses 105 and 106 positioned along the main channel 102 on the side opposite the branch channel 103. These reinforcement buttresses 105 and 106 serve to strengthen the connector. Another two reinforcement buttresses 107 and 108, shown in FIG. 1, are positioned along each side of the branch channel 103.

Also shown in FIG. 1 is a triangular panel 109 connecting the side of the branch channel 103 to the main channel 102. The triangular panel 109 serves as a structural connection to reduce flex within the connector 101. Another triangular panel 109 is placed on the other side of the branch channel 103 and is more readily seen in FIG. 2A.

Figure 2B:
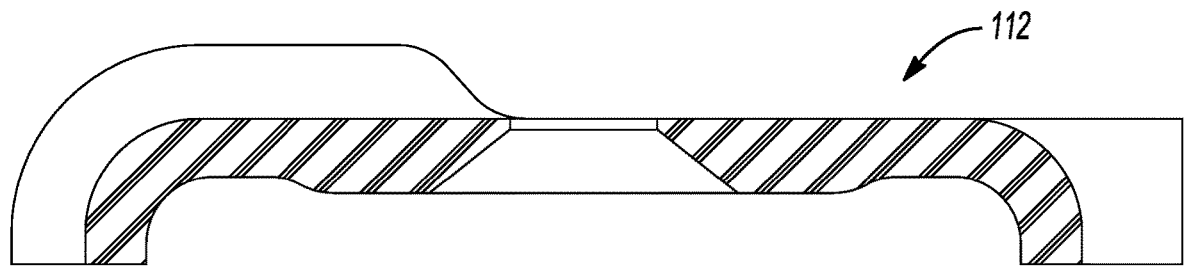
FIG. 2B is a section view of the rubber bumper which is fitted into holes within the connector.

Finally, FIG. 2A shows holes 110 and 111 on the main channel 102 of the connector 101. A rubber bumper 112, as shown on FIG. 2B, is fitted into each hole 110 and 111 to add friction to prevent the connector 101 from sliding across lumber fitted inside it.

In accordance with the invention, a system for dividing a truck bed 130 into compartments comprises the connector 101, a truck bed 130, a first piece of lumber 120 having a length equal to the width of the truck bed 130, a second piece of lumber 121 having a length equal to a distance less than the length of the truck bed 130. In one embodiment, the connector 101 is screwed into the second piece of lumber to hold it in place. A method for partitioning the truck bed 130 into three separate compartments comprises the steps of first positioning the connector 101 in the center of the truck bed 130. Next, the first piece of lumber 120 is fitted under the main channel 102 of the connector 101. Then, one end of the second piece of lumber 121 is fitted under the branch channel 103 of the connector 101, such that the other end of second piece of lumber 121 reaches the foot of the truck bed 130. The truck bed 130 owner or user can then make use of the three separate compartments within the truck bed 130, separating supplies, tools or other goods as he or she sees fit.

Other embodiments include utilizing two or more connectors 101 and three or more pieces of lumber to configure a partitioning design of the users choosing, as shown in FIG. 4. Such a system for dividing a truck bed 130 into compartments comprises at least two connectors 101, a truck bed 130, a first piece of lumber 120 having a length equal to the width of the truck bed 130, a second piece of lumber 121 and at least one more piece of lumber 123 having a length equal to a distance less than the length of the truck bed 130. The corresponding method for partitioning the truck bed into at least four separate compartments comprises the steps of first positioning the connectors 101 in the middle of the truck bed 130. Next, the first piece of lumber 120 is fitted under the main channel 102 of each of the connectors 101. Then, one end of the second piece of lumber 121 is fitted under the branch channel 103 of the first connector 101, such that the other end of second piece of lumber 121 reaches the foot of the truck bed 130. One end of the third piece of lumber 123 is fitted under the branch channel 103 of the second connector 101, such that the other end of third piece of lumber 123 reaches the foot of the truck bed 130. The truck bed 130 owner or user can then make use of the four separate compartments within the truck bed, separating supplies, tools or other goods as he or she sees fit.

It is to be understood that the foregoing description is not a definition of the invention but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

What is claimed is:

1. A three-way connector for lumber comprising:
   a. A main channel with an interior width to accommodate a piece of lumber;
   b. The main channel containing a branch channel at the midway point of the main channel, positioned at a ninety degree angle to the main channel, with an interior width to accommodate a piece of lumber; and
   c. One or more holes on the main channel and a rubber bumper fitted into each hole.

2. A three-way connector for lumber comprising:
   a. A main channel with two sides and an interior width to accommodate a piece of lumber; the main channel containing a branch channel with two sides positioned on one side of the main channel at the midway point of the main channel at a ninety degree angle to the main channel, with an interior width to accommodate a piece of lumber, further comprising a connection between the main channel and the branch channel;
   b. A divider panel inside the branch channel, parallel to the main channel, and located at the connection of the main channel to the branch channel;
   c. Two or more reinforcement buttresses positioned along the main channel on the side of the main channel which does not contain the connection to the branch channel;
   d. Two or more reinforcement buttresses positioned along each side of the branch channel; and
   e. a triangular panel connecting each side of the branch channel to the main channel.

3. The connector of claim 2 further comprising two or more holes on the main channel and a rubber bumper in each hole.

4. The connector of claim 2 constructed out of plastic resin material.

5. A system for dividing a truck bed into compartments comprising;
   a. A connector comprising a main channel with an interior width to accommodate a piece of lumber, the main channel containing a branch channel at the midway point of the main channel, positioned at a ninety degree angle to the main channel, with an interior width to accommodate a piece of lumber;
   b. A truck bed;
   c. A first piece of lumber having a length equal to the width of the truck bed;
   d. A second piece of lumber having a length equal to a distance less than the length of the truck bed;
   The connector being positioned in the center of the truck bed; the middle of the first piece of lumber being fitted under the main channel of the connector; and one end of the second piece of lumber being fitted under the branch channel of the connector, such that the other end of the second piece of lumber reaches the foot of the truck bed.

6. A system for dividing a truck bed into compartments comprising;
   a. A connector comprising a main channel with an interior width to accommodate a piece of lumber, the main channel containing a branch channel at the midway point of the main channel, positioned at a ninety degree angle to the main channel, with an interior width to accommodate a piece of lumber;
   b. A truck bed;
   c. A first piece of lumber having a length equal to the width of the truck bed;
   d. A second piece of lumber having a length equal to a distance less than the length of the truck bed;
   The connector being positioned in the center of the truck bed; the middle of the first piece of lumber being fitted under the main channel of the connector; one end of the second piece of lumber being fitted under the branch channel of the connector, such that the other end of the second piece of lumber reaches the foot of the truck bed; and the first piece of lumber and second piece of lumber being screwed to the connector.

7. A system for dividing a truck bed into compartments comprising;
   a. A three-way connector for lumber comprising a main channel with two sides with an interior width to accommodate a piece of lumber, the main channel containing a branch channel with two sides, positioned on one side of the main channel at the midway point of the main channel and at a ninety degree angle to the main channel, with an interior width to accommodate a piece of lumber, further comprising a connection between the main channel and the branch channel; a divider panel inside the branch channel, parallel to the main channel, and located at the connection of the main channel to the branch channel; two or more reinforcement buttresses positioned along the main channel on the side of the main channel which does not contain the connection to the branch channel; two or more reinforcement buttresses positioned along each side of the branch channel; and a triangular panel connecting each side of the branch channel to the main channel;
b. A truck bed;
c. A first piece of lumber having a length equal to the width of the truck bed;
d. A second piece of lumber having a length equal to a distance less than the length of the truck bed;
the connector being positioned in the center of the truck bed; the middle of the first piece of lumber being fitted under the main channel of the connector; and one end of the second piece of lumber being fitted under the branch channel of the connector, such that the other end of the second piece of lumber reaches the foot of the truck bed.

8. The system of claim 7 further comprising a second connector and a third piece of lumber having a length equal to a distance less than the length of the truck bed.

9. A system for dividing a truck bed into compartments comprising;
   a. A three-way connector for lumber comprising a main channel with two sides and an interior width to accommodate a piece of lumber, the main channel containing a branch channel with two sides, positioned on one side of the main channel at the midway point of the main channel, positioned at a ninety degree angle to the main channel, with an interior width to accommodate a piece of lumber, further comprising a connection between the main channel and the branch channel; a divider panel inside the branch channel, parallel to the main channel, and located at the connection of the main channel to the branch channel; two or more reinforcement buttresses positioned along the main channel on the side of the main channel which does not contain the connection to the branch channel; two or more reinforcement buttresses positioned along each side of the branch channel; and a triangular panel connecting each side of the branch channel to the main channel;
   b. A truck bed;
   c. A first piece of lumber having a length equal to the width of the truck bed;
   d. A second piece of lumber having a length equal to a distance less than the length of the truck bed;
   the connector being positioned in the center of the truck bed; the middle of the first piece of lumber being fitted under the main channel of the connector; one end of the second piece of lumber being fitted under the branch channel of the connector, such that the other end of the second piece of lumber reaches the foot of the truck bed; and the first piece of lumber and the second piece of lumber being screwed to the connector.

10. A method for dividing the bed of a pickup truck into compartments, the method comprising the steps of:
    a. Providing a connector comprising a main channel with an interior width to accommodate a piece of lumber, the main channel containing a branch channel at the midway point of the main channel, positioned at a ninety degree angle to the main channel, with an interior width to accommodate a piece of lumber; a truck bed; a first piece of lumber having a length equal to the width of the truck bed; and a second piece of lumber having a length equal to a distance less than the length of the truck bed; and
    b. Positioning the connector in the center of the truck bed; fitting the middle of the first piece of lumber under the main channel of the connector; and fitting one end of the second piece of lumber under the branch channel of the connector, such that the other end of the second piece of lumber reaches the foot of the truck bed.

11. A method for dividing the bed of a pickup truck into compartments, the method comprising the steps of:
    a. Providing a connector comprising a main channel with an interior width to accommodate a piece of lumber, the main channel containing a branch channel at the midway point of the main channel, positioned at a ninety degree angle to the main channel, with an interior width to accommodate a piece of lumber; a truck bed; a first piece of lumber having a length equal to the width of the truck bed; and a second piece of lumber having a length equal to a distance less than the length of the truck bed; and
    b. Positioning the connector in the center of the truck bed; fitting the middle of the first piece of lumber under the main channel of the connector; fitting one end of the second piece of lumber under the branch channel of the connector, such that the other end of the second piece of lumber reaches the foot of the truck bed; and screwing the first piece of lumber and second piece of lumber to the connector.

12. A method for dividing the bed of a pickup truck into compartments, the method comprising the steps of:
    a. Providing a three-way connector for lumber comprising a main channel with two sides and an interior width to accommodate a piece of lumber, the main channel containing a branch channel with two sides, positioned on one side of the main channel and at the midway point of the main channel and at a ninety degree angle to the main channel, with an interior width to accommodate a piece of lumber, further comprising a connection between the main channel and the branch channel; a divider panel inside the branch channel, parallel to the main channel, and located at the connection of the main channel to the branch channel; two or more reinforcement buttresses positioned along the main channel on the side of the main channel which does not contain the connection to the branch channel two or more reinforcement buttresses positioned along each side of the branch channel; and a triangular panel connecting each side of the branch channel to the main channel; a truck bed; a first piece of lumber having a length equal to the width of the truck bed; and a second piece of lumber having a length equal to a distance less than the length of the truck bed; and
    b. Positioning the connector in the center of the truck bed; fitting the middle of the first piece of lumber under the main channel of the connector; and fitting one end of the second piece of lumber under the branch channel of the connector, such that the other end of the second piece of lumber reaches the foot of the truck bed.

13. The method of claim 12, further comprising the steps of
    a. Providing a second connector and a third piece of lumber having the same length as the second piece of lumber;
    b. Fitting the main channel of the second connector on the first piece of lumber; and
    c. Fitting the branch channel of the second connector on one end of the third piece of lumber.

14. A method for dividing the bed of a pickup truck into compartments, the method comprising the steps of:
    a. Providing a three-way connector for lumber comprising a main channel with two sides and an interior width to accommodate a piece of lumber, the main channel containing a branch channel with two sides, positioned on one side of the main channel at the midway point of the main channel and at a ninety degree angle to the main channel, with an interior width to accommodate a piece of lumber, further comprising a connection between the main channel and the branch channel; a divider panel inside the branch channel, parallel to the main channel, and located at the connection of the main channel to the branch channel; two or more reinforcement buttresses positioned along the main channel on the side of the main channel which does not contain the connection to the branch channel; two or more reinforcement buttresses positioned along each side of the branch channel; and a triangular panel connecting each side of the branch channel to the main channel; a truck bed; a first piece of lumber having a length equal to the width of the truck bed; and a second piece of lumber having a length equal to a distance less than the length of the truck bed; and b. Positioning the connector in the center of the truck bed; fitting the middle of the first piece of lumber under the main channel of the connector; fitting one end of the second piece of lumber under the branch channel of the connector, such that the other end of the second piece of lumber reaches the foot of the truck bed; and screwing the first piece of lumber and the second piece of lumber to the connector.

* * * * *

UNITED STATES PATENT AND TRADEMARK OFFICE
CERTIFICATE OF CORRECTION

| | |
|---|---|
| PATENT NO. | : 11,603,030 B2 |
| APPLICATION NO. | : 16/906470 |
| DATED | : March 14, 2023 |
| INVENTOR(S) | : David Buckley |

It is certified that error appears in the above-identified patent and that said Letters Patent is hereby corrected as shown below:

In the Specification

Column 3, Line 56 insert --and;-- after "channel" and before "at a ninety degree"

Column 6, Line 39 insert --;-- after "the branch channel"

Signed and Sealed this
Sixteenth Day of May, 2023

Katherine Kelly Vidal
Director of the United States Patent and Trademark Office